United States Patent [19]

Zenker

[11] 4,108,291

[45] Aug. 22, 1978

[54] POWER TAKE OFF WITH CLUTCH AND BRAKE

[75] Inventor: Walter Zenker, Bensberg-Refrath, Fed. Rep. of Germany

[73] Assignee: Klöckner-Humboldt-Deutz Aktiengesellschaft, Cologne, Fed. Rep. of Germany

[21] Appl. No.: 686,951

[22] Filed: May 17, 1976

[30] Foreign Application Priority Data

May 21, 1975 [DE] Fed. Rep. of Germany ....... 2522411

[51] Int. Cl.² ............................................. F16D 67/04
[52] U.S. Cl. ................... 192/4 R; 192/18 A; 74/411.5; 188/170
[58] Field of Search .................. 192/18 A, 4 A, 4 R; 74/411.5

[56] References Cited

U.S. PATENT DOCUMENTS

| 2,998,872 | 9/1961 | Sommer et al. ................. 192/18 A |
| 3,209,872 | 10/1965 | Moyer et al. ................. 192/18 A X |

*Primary Examiner*—Benjamin W. Wyche
*Attorney, Agent, or Firm*—Walter Becker

[57] ABSTRACT

A power take off, especially for an agricultural or construction type vehicle, in which an input shaft and an output shaft have a train of meshing gears extending therebetween with a normally disengaged friction clutch having input and output parts interposed between the input shaft and the first gear of the train. A brake is provided having a brake body normally engaging the output part of the friction clutch. The brake structure is supported in a stationary tubular element which also forms the journal means for another gear of the series of meshing gears. Fluid operable means are provided for actuating the clutch toward engaged position and the brake toward disengaged position.

9 Claims, 2 Drawing Figures

POWER TAKE OFF WITH CLUTCH AND BRAKE

The present invention concerns a power withdrawal, especially a power input shaft for motor vehicles for agricultural and construction purposes which comprises a first input shaft journalled in a housing and further comprises a second input shaft which extends from the first input shaft and is preferably designed as a hydraulic clutch which while being spring-urged in disengaging direction can selectively be engaged and disengaged. That portion of the friction clutch which represents the output side has associated therewith a brake adapted to be engaged and disengaged and equipped with a brake body which is spring-urged in engaging position and which extends parallel to the mounting of the friction clutch while being guided axially in the housing.

With power withdrawals of the above described general character there exists the problem of favorably so to design the means for forming an engageable and disengageable brake that these means can in a space saving manner be arranged in the same housing which houses the friction clutch and a counter gear transmission.

Starting with these findings, it is an object of the present invention so to improve the power withdrawal of the above mentioned type that while obtaining a design that is favorable from the stand-point of manufacturing costs will result in a space saving construction.

This object and other objects and advantages of the invention will appear more clearly from the following specification in connection with the accompanying drawing diagrammatically illustrating a section through a power withdrawal according to the invention which is designed as power input shaft of a change gear transmission, especially for agriculture.

The power withdrawal according to the present invention is characterized primarily in that the axial guiding means of the brake body is arranged within the mounting of a gear of an intermediate transmission. Such an arrangement has the advantage that with a double utilization of structural elements, those elements which form the mounting of a gear of the counter gear transmission simultaneously form the brake associated with the friction clutch.

According to a further development of the invention it is provided that the mounting of the gear of the intermediate transmission comprises a bearing pivot which is stationarily arranged in the housing. Furthermore, within the bearing pivot there is guided a bolt which is operatively connected to a pressure fluid actuated piston and which has one end thereof operatively connected to the brake body.

Expediently, for reasons for saving space, the spring associated with the brake body is arranged within the mounting of the gear of the intermediate transmission.

A structurally space saving and advantageous solution is obtained in conformity with the present invention by providing that the mounting of the gear of the intermediate transmission is designed as a hollow bearing pivot which surrounds the spring associated with the brake body. Furthermore, the spring is connected to a bolt which is disengageably connected to the brake body. The bolt is axially guided in one end of the bearing pivot while the other end of the bearing pivot is operatively connected to the pressure medium actuated piston. For obtaining a particularly favorable braking effect and to prevent a rotation of the brake body relative to the friction clutch, it is further advantageous to couple the brake body to the bearing pivot through the intervention of rotation preventing means. A particularly favorable rotation preventing means of this type with regard to saving of manufacturing costs consists in a transverse pin connecting the brake body with the bolt while the bearing pivot has a longitudinal groove through which extends the transverse pin.

According to a further feature of the invention it is provided that the bearing pivot has both ends thereof journalled in associated bearing webs or bearing brackets of the housing. One of these bearings in cooperation with one end of the bearing pivot and with a piston guided in the bearing and operatively connected to the brake body forms a working chamber for disengagement of the brake. A particularly simple solution with regard to manufacture and assembly is obtained by the fact that the bearing which partly forms the working chamber for disengagement of the brake is designed as a pot-shaped structural element which is inserted into a second stationary bearing which has a larger inner diameter than the inner diameter of the first bearing of the bearing pivot, the pot-shaped structural element being axially fixed. The pot-shaped structural element has guided therein a piston and comprises a transverse bore which is located ahead of the piston. This transverse bore is in operative communication with a pressure medium conveying passage of the second stationary bearing when the pot-shaped structural element occupies its assembled and mounted position. For preventing a shock-like impact of the piston upon its associated abutment, it is advantageous to establish communication between the chamber enclosed by the piston on the bottom of the pot-shaped structural element and a pressure-less chamber. This communication between the two chambers is effected through a throttle preferably provided on the bottom of the pot-shaped structural element.

For venting the spring chamber of the brake and for supplying spray oil to the bearings and the teeth of the gear of the intermediate transmission, it is provided in conformity with the present invention that the bearing pivot comprises a collar between the two stationary bearings which collar serves as abutment for antifriction bearings located on both sides of the abutment on the bearing pivot. It is furthermore provided that the collar has a first transverse bore which establishes communication between the chamber for receiving the spring of the brake body and the outer circumference of the collar. This first transverse bore communicates through a second transverse bore with the outer circumference of a gear. This last mentioned gear is journalled on the bearing pivot above both antifriction bearings of the bearing pivot.

IN THE DRAWINGS

Figure 1:
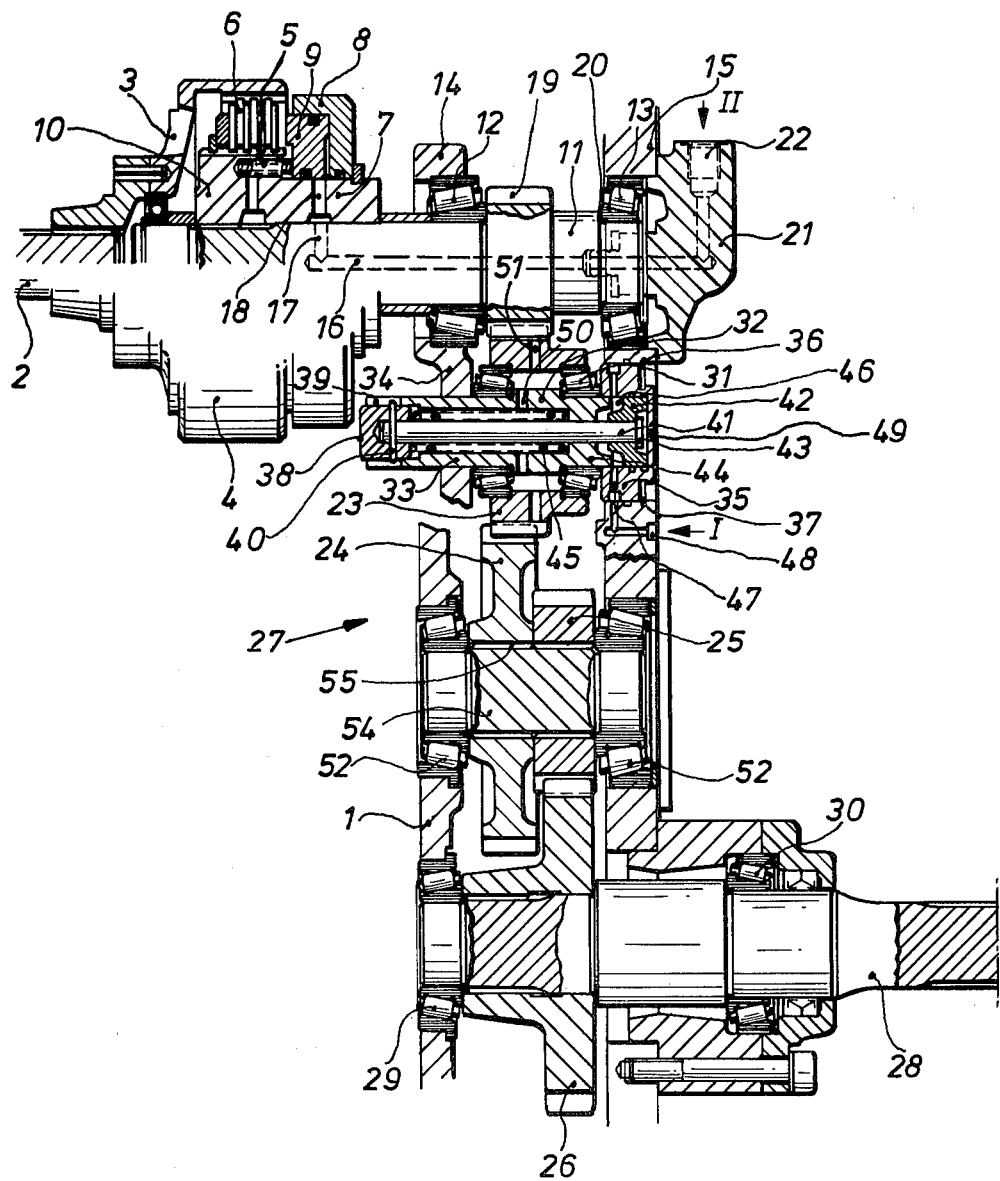
FIG. 1 is a partially sectioned elevational view showing features of the present invention.
Figure 2:
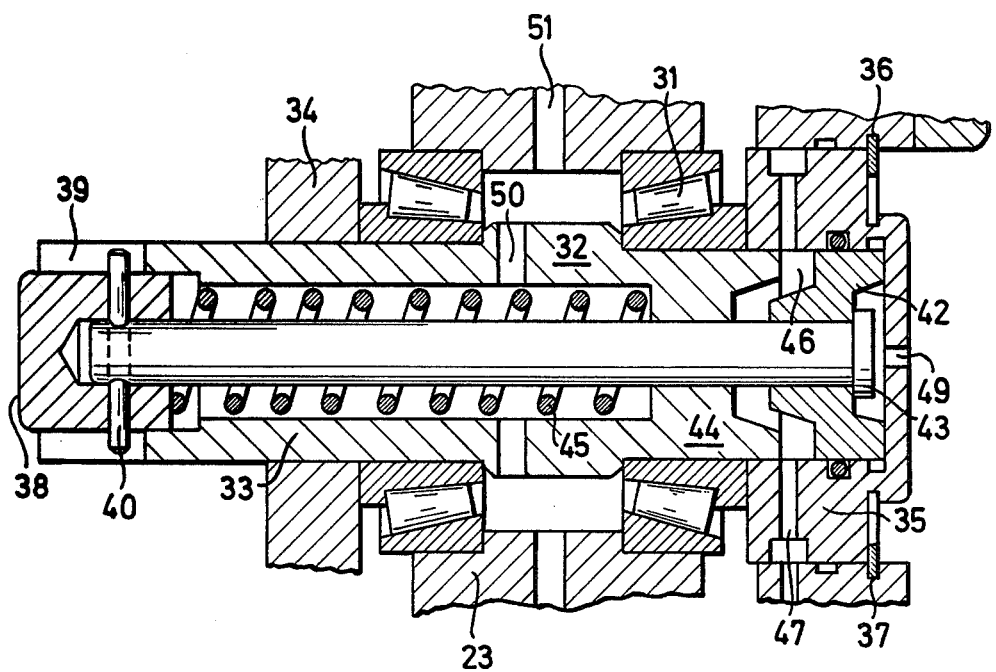
FIG. 2 is a sectional enlarged view of a portion of FIG. 1.

Referring now to the drawings in detail, the power withdrawal which is designed as an input shaft drive of a change gear transmission for vehicles for agricultural purposes comprises a transmission housing 1. Journalled in the transmission housing 1 is a drive shaft 2 journalled in not illustrated bearings. One end portion of the drive shaft 2 is non-rotatably connected to the primary part 3 of a friction clutch 4 which is adapted to be engaged and disengaged. The friction clutch 4 comprises a clutch disc or lamellae 6 which by means of a spring 5 are continuously urged in a direction to disengage the clutch. The lamellae 6 are adapted by means of an annular piston 9 to be acted upon so as to move in closing direction. The annular piston 9 is guided in an annular cylinder 8 provided in the secondary part 7 of the friction clutch 4. The secondary part 7 furthermore comprises a hub-shaped part 10 which adjacent the annular cylinder 8 serves for radially guiding the annular cylinder 8 and is non-rotatably connected to an intermediate shaft 11 which through the intervention of a bearing 12, 13 is journalled in a bearing bracket 14, 15 of the transmission housing 1. The right-hand end face of the intermediate shaft 11 is provided with an axially extending pressure fluid conveying passage 16 which latter through a transverse bore 17 of shaft 11 and a transverse bore 18 provided in the hub-shaped part 10 communicates with the working chamber of the annular cylinder 8. The intermediate shaft 11 is between te two antifriction bearings 12, 13 provided with a gear 19 which serves as left-hand abutment adjacent a right-hand collar 20 for axially arresting the intermediate shaft 11. The axial play of the intermediate shaft 11 is adjustable by means of a bearing cover 21 which is clamped to the bearing bracket 15. The bearing cover 21 is provided with a pressure fluid connection 22 for supplying or withdrawing the pressure fluid which by means of a non-illustrated control member is conveyed to or withdrawn from the annular cylinder 8 through the pressure fluid passage 16 and the transverse bores 17, 18.

There is furthermore provided on intermediate transmission 27 which is formed by the gear 19 in combination with a gear 23 meshing with gear 19, a gear 24 meshing with gear 23, a gear 25 which is non-rotatably connected to gear 24, and a gear 26 which is directly driven by gear 25. The intermediate transmission 27 is provided for driving a pivot shaft 28 which is connected to the gear 26. The rotary force is derived from pivot shaft 28 and conveyed to the outside. The pivot shaft 28 is journalled in the transmission housing 1 through the intervention of antifriction bearings 29 and 30 respectively located on both ends of the pivot shaft 28.

By way of two antifriction bearings 31 which are preferably designed as conical roller bearings, the gear 23 is mounted on a bearing 33 having an outer collar 32. The bearing 33 is mounted directly stationarily in the bearing bracket 14 of the transmission housing 1 and in the bearing bracket 15 is mounted by way of the latter by means of a pot-shaped bearing 35. The outer collar 32 serves in combination with the bearing 35 and with a spring ring 37 engaging a groove 36 of the bearing bracket 15 for axially adjusting the play of the antifriction bearings 31 and thus simultaneously serves for axially arresting the gear 23. In the bearing pivot 33 which is sleeve-shaped there is guided on the left-hand side thereof a brake body 38 which when occupying its braking position engages the right-hand end face of the annular cylinder 8. The brake body 38 is secured against rotation by means of a pin 40 which extends through the brake body 38 and a longitudinal groove 39 of the bearing pivot 33. The pin 40 simultaneously connects the brake body 38 to a bolt 41 which is axially guided in the bearing pivot 33 and which passes through a piston 42 and has a follower for the piston in the form of an outer collar 43. Between the brake body 38 and the bottom 44 of the bearing pivot 33, the bolt 41 is surrounded by a spring 45 which acts upon the brake body 38 in braking direction.

The bottom 44 and the piston 42 form in the pot-shaped bearing 35 a working chamber 46 which, when supplying pressure fluid, brings about a displacement of the brake body 38 away from the right-hand end face of the annular cylinder 8. The working chamber 46 is through a transverse bore 47 of the pot-shaped bearing 35 supplied with pressure fluid through a passage 48 of the transmission housing 1.

The pressure fluid passage 48 communicates through a non-illustrated pressure fluid conduit, similar to the pressure fluid connection 22, with the same control device. For venting in a throttling manner, the hollow chamber enclosed by the piston 42 and the bottom of the pot-shaped bearing 35 is connected to the atmosphere through the intervention of a throttle bore 49. As a result thereof, it will be realized that when the piston 42 is suddenly acted upon by a pressure medium, it will not impact in a shock-like manner upon the bottom of bearing 35 which latter serves as abutment for piston 42. For venting the hollow chamber of the bearing pivot 33 which chamber is enclosed by spring 45, the bearing pivot 33 is provided with transverse bores 50 through which the oil containing air displaced by spring 45 can through bores 51 of gear 23 flow off into the housing chamber 1 while simultaneously oil mist is conveyed to the antifriction bearings 31. Parallel to the bearing pivot 33, in the transmission housing 1 and in antifriction bearings arranged on both sides of the housing 1 there is journalled bearing pivot 54. This bearing pivot 54 has a follower profile 55 on which the two gears 24, 25 are mounted in a non-rotatable manner.

It may be mentioned that according to the invention the axial guiding of the brake body 38 and the arrangement of its guiding elements are not dependent on the described intermediate transmission 27. The reason therefor consists in that this intermediate transmission 27 may have any desired design which allows utilization of the bearing of an intermediate gear for receiving the axial guiding means for the brake body 38. Thus, the invention is, for instance, also applicable to an intermediate transmission designed as a pull transmission provided that a tensioning or deviating roller of the intermediate transmission has its axis located within the region of the outer diameter of the secondary part of the friction clutch 4 or within the region of the means adapted to be driven and braked by the secondary part.

It is, of course, to be understood that the present invention is, by no means, limited to the specific showing in the drawing but also comprises any modifications within the scope of the appended claims.

What is claimed is:

1. A power take off, especially for agricultural and construction vehicles which includes a housing and transmission means therein connecting an input shaft with an output shaft, said transmission means including a train of meshing gears, a supporting journal means stationarily mounted in the housing for at least one of said gears, a friction clutch having input and output parts interposed between the input shaft and a first of said gears and normally biased toward disengaged position and engageable by fluid pressure means, brake means including a brake body engageable with the output part of said clutch and normally biased toward engaged position, said brake means being moveable in a direction parallel to the axis of said clutch, guiding means for said brake means embodied in said journal means, and fluid operable means connected to the brake means for movement thereof in disengaging direction to move said brake body away from the output part of said clutch, the said journal means comprising a tubular element, said brake means including a rod extending axially through and guided by said tubular element, said brake body being connected to one end of said rod and said fluid operable means being connected to the other end of said rod, and a spring within said tubular element acting on said brake means and comprising the means for biasing said brake means toward engaged position.

2. A power take off according to claim 1 in which the said journal means comprises a tubular element, said brake means including a rod extending axially through and guided by said tubular member, said brake body being connected to one end of said rod and said fluid operable means being connected to the other end of said rod.

3. A power take off, especially for agricultural and construction vehicles which includes a housing and transmission means therein connecting an input shaft with an output shaft, said transmission means including a train of meshing gears, a supporting journal means stationarily mounted in the housing for at least one of said gears, a friction clutch having input and output parts interposed between the input shaft and a first of said gears and normally biased toward disengaged position and engageable by fluid pressure means, brake means including a brake body engageable with the output part of said clutch and normally biased toward engaged position, said brake means being moveable in a direction parallel to the axis of said clutch, guiding means for said brake means embodied in said journal means, and fluid operable means connected to the brake means for movement thereof in disengaging direction to move said brake body away from the output part of said clutch, said journal means comprising a tubular element, said brake body being reciprocably guided in one end of said tubular element, said brake means including a rod extending axially through said tubular element and connected at one end to said brake body, guiding means on said tubular element engaging said rod near the other end, said fluid operable means being operatively connected to said other end of said rod.

4. A power take off according to claim 3 which includes means nonrotatably connecting said brake body to said journal means while permitting reciprocation of the brake body relative to the journal means.

5. A power take off according to claim 3 which includes a pin extending transversely through said brake body and rod to connect the brake body to the rod, said tubular member comprising axial slot means at the brake body end into which said pin extends for holding the brake body against rotation relative to said tubular element.

6. A power take off, especially for agricultural and construction vehicles which includes a housing and transmission means therein connecting an input shaft with an output shaft, said transmission means including a train of meshing gears, a supporting journal means stationarily mounted in the housing for at least one of said gears, a friction clutch having input and output parts interposed between the input shaft and a first of said gears and normally biased toward disengaged position and engageable by fluid pressure means, brake means including a brake body engageable with the output part of said clutch and normally biased toward engaged position, said brake means being moveable in a direction parallel to the axis of said clutch, guiding means for said brake means embodied in said journal means, and fluid operable means connected to the brake means for movement thereof in disengaging direction to move said brake body away from the output part of said clutch, said housing including spaced walls forming bearing brackets, said journal means comprising a tubular element fixed in one of said walls, means in the other wall coaxial with said tubular element engaging the adjacent end of said tubular element and forming a fluid operable chamber, a rod extending axially through said tubular element and connected at one end to said brake body and extending into said chamber at the other end, and a piston connected to said rod and reciprocable in said chamber, said piston and chamber forming said fluid operable means connected to said brake means.

7. A power take off according to claim 6 in which said means forming said fluid operable chamber comprises a pot shaped member fixed in said other wall and opening toward said tubular element and supportingly engaging the adjacent end of said tubular element, a fluid passage extending into said other wall and then into the chamber formed by said pot shaped member adjacent the end of said tubular element, said piston being mounted on said rod so that said passage communicates with the space between said piston and the adjacent end of sad tubular element.

8. A power take off according to claim 7 in which said pot shaped member has a wall on the side of said piston opposite said tubular element, and a restricted port extending through said wall and communicating with the side of said piston which faces away from said tubular element.

9. A power take off, especially for agricultural and construction vehicles which includes a housing and transmission means therein connecting an input shaft with an output shaft, said transmission means including a train of meshing gears, a supporting journal means stationarily mounted in the housing for at least one of said gears, a friction clutch having input and output parts interposed between the input shaft and a first of said gears and normally biased toward disengaged position and engageable by fluid pressure means, brake means including a brake body engageable with the output part of said clutch and normally biased toward engaged position, said brake means being movable in a direction parallel to the axis of said clutch, guiding means for said brake means embodied in said journal means, and fluid operable means connected to the brake means for movement thereof in disengaging direction to move said brake body away from the output part of said clutch, said housing comprising spaced walls, said journal means comprising a tubular element extending between and supported by said walls, said tubular element having an enlarged diameter portion intermediate the length thereof presenting oppositely facing shoulders spaced from said walls, antifriction bearings mounted on said tubular element and engaging said shoulders, radial bore means formed in the enlarged diameter portion of said tubular element, said one gear being rotatably supported on said antifriction bearings and radial bore means in said gear communicating with the space in the gear between said bearings, and, therefore, communicating with the radial bore means in said tubular element.

* * * * *